UNITED STATES PATENT OFFICE.

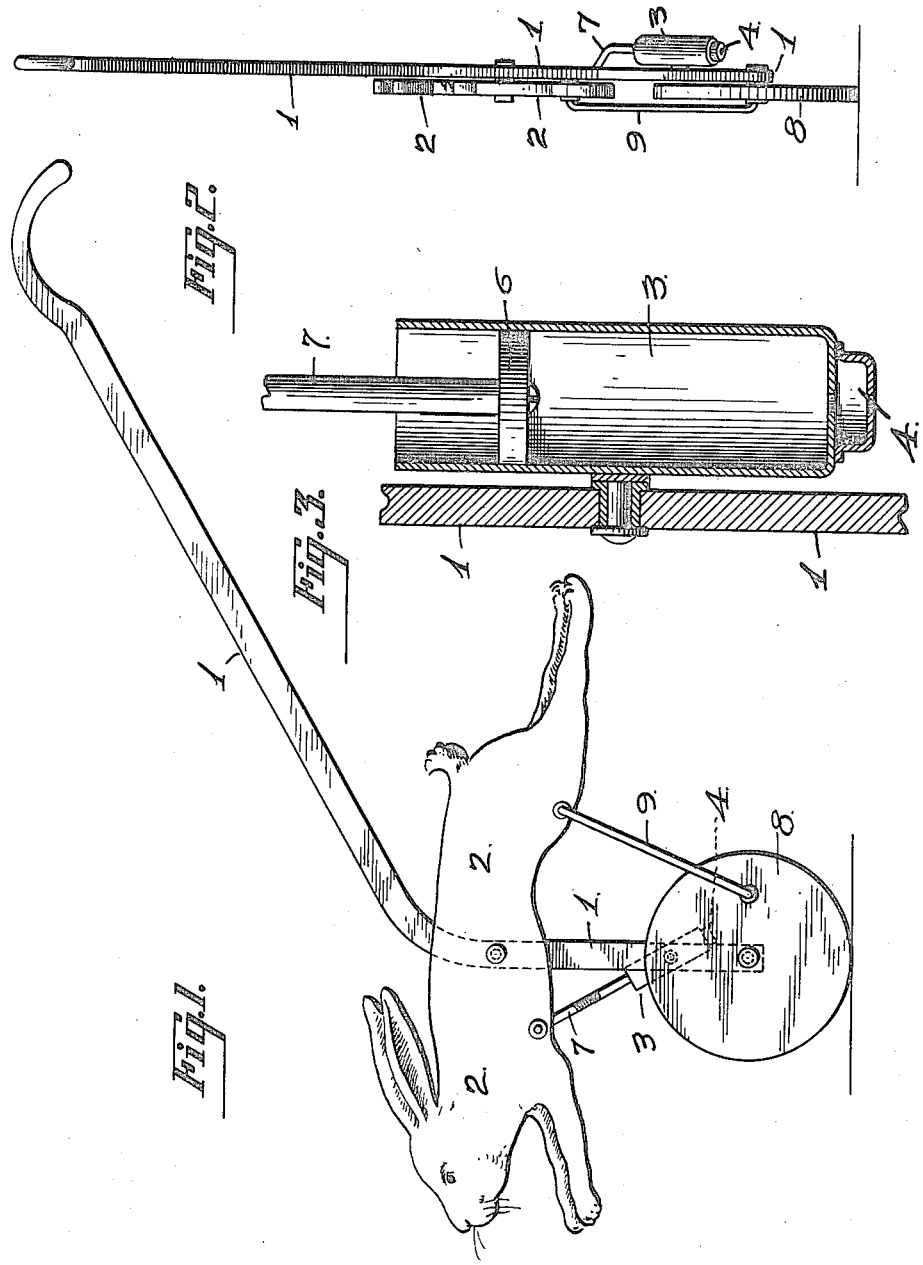

FRANK M. PROCTOR, OF SAN FRANCISCO, CALIFORNIA, ASSIGNOR TO ZACCHEUS W. WHITE, OF SAN FRANCISCO, CALIFORNIA.

TOY.

1,183,232.  Specification of Letters Patent.  Patented May 16, 1916.

Application filed June 1, 1915. Serial No. 31,602.

*To all whom it may concern:*

Be it known that I, FRANK M. PROCTOR, a citizen of the United States, residing in the city and county of San Francisco and State of California, have invented a new and useful Improvement in Toys, of which the following is a specification.

My invention relates to a toy wherein a representation of an animal in flight operates in conjunction with means adapted to counterfeit an utterance of the animal represented; and the objects of my invention are, first, to provide a new and novel toy for amusement purposes; second, to provide a toy for amusement purposes that shall represent an animal in flight, and third, to provide a toy that will represent an animal in flight and simultaneously counterfeit an utterance thereof. I accomplish these several features by means of the device, in its preferred form, disclosed in the drawings forming a part of the present specification wherein like characters of reference are used to designate similar parts throughout the said specification and drawings, and in which—

Figure 1 is a front elevation of my improved toy. Fig. 2 is a rear or end elevation of the toy disclosing the cylinder which counterfeits an utterance of the animal represented, and Fig. 3 is a detailed vertical sectional view of the cylinder and piston therein by means of which an utterance of the animal represented is produced.

Referring to the drawings the numeral 1 is used to designate a suitable handle on which, at a convenient height, is pivotally mounted a representation of an animal in flight. While I have illustrated a jack-rabbit in the present instance it is to be understood that a representation of any animal may be provided without departing from the spirit of the invention.

A means is provided that is adapted to operate in conjunction with the representation 2 whereby an utterance or cry of the animal represented may be counterfeited. In the present instance this means consists of a cylinder 3, pivotally mounted upon the handle 1 a convenient working distance below the representation 2, provided with a suitable whistle 4. A piston 6 is slidably mounted within the cylinder 3 and is operatively connected, by means of the stem 7 thereof, with one end of the representation 2, the upper end of said stem being pivotally connected to the said representation 2.

A wheel 8 is rotatably mounted upon the lower end of the handle 1 and is operatively connected to the representation 2 by means of a suitable connecting rod 9 so that when the said wheel 8 is rotated or rolled upon the floor or ground by means of the handle 1 the movement of the wheel 8 will impart a reciprocating movement to the representation 2, which, acting as a walking beam, will impart a similar movement to the stem 7 and piston 6 secured thereto and slidably mounted within the cylinder 3, thereby causing the said piston 6 to draw air through the whistle 4 or other means whereby the cry or utterance of an animal may be simulated. As the wheel 8 is rotated by means of rolling on the floor or ground the representation 2 will appear to be in flight while the piston 6 will operate to produce a simulation or counterfeit of the cry of an animal represented.

It is evident that the scope of the whistle 4 may be altered or adjusted so as to produce or counterfeit the cry of various animals. It is also obvious that any animal may be represented without departing from the spirit of the invention. It is also obvious from the foregoing that I have provided a new toy wherein a representation of an animal may be made to appear as if in flight and also means for counterfeiting the cry or utterance of the animal represented simultaneously.

I am aware that the present state of the art discloses toys consisting of various figures operatively connected to a wheel or roller whereby said figures are caused to reciprocate; I therefore do not wish to claim such a combination broadly as my invention but What I do claim as new and desire to secure by Letters Patent is—

1. A toy comprising a suitable handle; a wheel rotatably mounted upon the lower end of the handle; a representation of an animal pivotally mounted upon the handle and directly above the wheel; a suitable connecting rod operatively connected to the representation and to the wheel whereby movement may be imparted to the said representation; and a suitable whistle pivotally mounted upon the handle and operatively connected to the representation whereby a movement of the same will operate said whistle.

2. A toy comprising a suitable handle; a wheel rotatably mounted upon the lower end of the handle; a representation of an animal in flight pivotally mounted at its approximate center to the handle; a suitable connecting rod operatively connected to one end of the representation and to the wheel whereby movement may be imparted to the former when the latter is rotated; a cylinder having a whistle in one end thereof pivotally mounted on the handle; and a piston operatively connected to the other end of the representation and slidably mounted within the cylinder whereby the whistle may be operated.

3. A toy comprising a suitable handle; a wheel rotatably mounted upon the lower end of the handle; a centrally pivoted representation of an animal in flight mounted upon the handle and above the wheel; a suitable connecting rod eccentrically pivoted to the wheel and connected to one end of the representation; a cylinder pivotally mounted upon the handle and directly above the wheel and having a suitable whistle in one end thereof; and a suitable piston slidably mounted within the cylinder and operatively connected to the other end of the representation whereby the whistle may be sounded when the representation is operated.

In witness whereof I hereunto set my signature.

FRANK M. PROCTOR.